(12) United States Patent
Ting et al.

(10) Patent No.: US 9,631,089 B2
(45) Date of Patent: Apr. 25, 2017

(54) THERMOPLASTOC POLYURETHANE COMPOSITE MATERIAL, SHOE MATERIAL, HEAD-MOUNTED DISPLAY AND SMART WATCH

(71) Applicant: EVERMORE CHEMICAL INDUSTRY CO.,LTD., Nantou County (TW)

(72) Inventors: Wei-Ho Ting, Taichung (TW);
Pin-Jung Chen, Hualien County (TW);
Charles Huang, Nantou County (TW);
Shih-Chieh Wang, Nantou County (TW)

(73) Assignee: EVERMORE CHEMICAL INDUSTRY CO., LTD., Nantou County (TW)

( * ) Notice: Subject to any disclaimer, the term of this patent is extended or adjusted under 35 U.S.C. 154(b) by 0 days.

(21) Appl. No.: 14/989,812

(22) Filed: Jan. 7, 2016

(65) Prior Publication Data
US 2017/0015825 A1    Jan. 19, 2017

(30) Foreign Application Priority Data

Jul. 16, 2015 (TW) .............................. 104123107 A

(51) Int. Cl.
| | | |
|---|---|---|
| *C08L 75/04* | (2006.01) | |
| *A43B 5/02* | (2006.01) | |
| *A43B 13/22* | (2006.01) | |
| *A43B 1/14* | (2006.01) | |
| *C08J 3/24* | (2006.01) | |
| *G02C 5/00* | (2006.01) | |
| *C08K 5/00* | (2006.01) | |

(52) U.S. Cl.
CPC .............. *C08L 75/04* (2013.01); *A43B 1/14* (2013.01); *A43B 5/02* (2013.01); *A43B 13/22* (2013.01); *C08J 3/24* (2013.01); *C08K 5/0025* (2013.01); *G02C 5/008* (2013.01); *C08G 2410/00* (2013.01)

(58) Field of Classification Search
CPC ....................................................... C08L 83/04
See application file for complete search history.

(56) References Cited

U.S. PATENT DOCUMENTS 4,500,688 A * 2/1985 Arkles .................. C08G 77/42
525/106

FOREIGN PATENT DOCUMENTS

| CN | 1568351 A | 1/2005 |
| CN | 103408944 A | 11/2013 |

OTHER PUBLICATIONS

"Shore Durometer Hardness Testing of Rubber and Plastics" from www.matweb.com/reference/shore-hardness.aspx (no date).*
Product data sheet for Pellethane 2102-80A from www.matbeb.com/search/datasheet.aspx?matguid=e0d1504caae64daca15fce464a94dba2&ckck=1.*

* cited by examiner

*Primary Examiner* — Marc Zimmer
(74) *Attorney, Agent, or Firm* — CKC & Pateners Co., Ltd.

(57) ABSTRACT

A thermoplastic polyurethane composite material composition includes a plastic base material and a curing agent, the plastic base material includes a thermoplastic polyurethane and a silicone gum including at least two alkenyl groups in each of molecules thereof, wherein the thermoplastic polyurethane and the silicone gum are uniformly mixed, and a weight ratio of the thermoplastic polyurethane and the silicone gum is ranging from 95.01:4.99 to 99.5:0.5. The curing agent is uniformly mixed with the plastic base material, wherein the curing agent has an adding amount enabling the silicone gum to crosslink to form a silicone rubber.

4 Claims, 4 Drawing Sheets

THERMOPLASTOC POLYURETHANE COMPOSITE MATERIAL, SHOE MATERIAL, HEAD-MOUNTED DISPLAY AND SMART WATCH

RELATED APPLICATIONS

This application claims priority to Taiwan Application Serial Number 104123107, filed Jul. 16, 2015, which is herein incorporated by reference.

BACKGROUND

Technical Field

The present disclosure relates to a thermoplastic polyurethane composite material, a composition thereof, a manufacturing method thereof, a shoe material made therefrom and a wearable apparatus made therefrom. More particularly, the present disclosure relates to a thermoplastic polyurethane composite material featured with excellent slip resistance and excellent abrasion resistance, a composition thereof, a manufacturing method thereof, a shoe material lade therefrom and a wearable apparatus made therefrom.

Description of Related Art

Thermoplastic, polyurethane (TPU) is a copolymer including hard segments and soft segments, wherein the hard segments are provided by a polyurethane (PU) obtained from a reaction of short-chain polyols and isocyanates, and the soft segments are provided by a PU obtained from a reaction of long-chain polyols and isocyanates. Furthermore, TPU can be sorted into two categories, ether-based TPU and ester-based TPU according to its reactant, ether-based polyols or ester-based polyols. The main properties of TPU are as follows: (1) a wide range of hardness: the ratio of each of the reactants of TPU can be adjusted so as to obtain the products with different hardness and an elasticity and an abrasion resistance of TPU can be maintained while increasing the hardness; (2) a high mechanical strength: the products made of TPU has an excellent bearing capacity, impact resistance and shock absorption; (3) an outstanding cold resistance: TPU has a lower glass transition temperature, whereby the elasticity and flexibility thereof can be maintained at the temperature of $-35°$ C.; (4) an excellent processing performance: TPU can be processed by common processing methods for thermoplastic materials, such as injection molding, extrusion and calendering; (5) a recyclability; (6) an oil resistance; (7) a good transparency. Based on the aforementioned properties, in the industrial field, TPU is widely used in manufacture of automotive, mechanical and industrial components, such as low-speed tires, shockproof elements, dust cover, interior and exterior decorative pieces of automobiles, gaskets and bearings. In the areas of daily life, TPU is used to manufacture products of shoe materials, clothing materials, sporting goods, medical equipment or toys, such as inflatable rafts, skis, half soles or shoe heels. The application of TPU is rooted in modern life, with the rise of environmental consciousness, replacing PVC with TPU has become a current trend. Accordingly, TPU has become one of the most important plastic materials nowadays.

TPU has a lot of advantages as mentioned above, nevertheless, the slip resistance provided thereby is limited. As result, the application of TPU is limited. Taking TPU applied to shoe material as example, TPU is mainly used to manufacture support materials of shoe bodies, such as half soles or shoe heels, or is used to manufacture decorations or waterproof layers of shoe uppers. For instance, a TPU thin film can be first colored by screen printing then molded and adhered on a shoe upper by high frequency as a decoration, or a waterproof TPU thin film can be adhered on a shoe cloth to provide the water proof effect. However, TPU is rarely used to manufacture outsoles due to its poor slip resistance, which is unfavorable to use on a damp or smooth road.

In view of the foregoing, how to improve the properties of TPU, which can enhance the slip resistance while maintaining the original physical properties (such as abrasion resistance) so as to broaden the scope of the application is the goal of the related industries.

SUMMARY

According to one aspect of the present disclosure, a thermoplastic polyurethane composite material composition includes a plastic base material and a curing agent. The plastic base material includes a TPU and a silicone gum. The silicone gum includes at least two alkenyl groups in each of molecules thereof. The TPU and the silicone gum are uniformly mixed, and a weight ratio of the TPU and the silicone gum is ranging from 95.01:4.99 to 99.5:0.5. The curing agent is uniformly mixed with the plastic base material, wherein the curing agent has an adding amount enabling the silicone gum to crosslink to form a silicone rubber.

According to another aspect of the present disclosure, a method for manufacturing a thermoplastic polyurethane composite material includes steps as follows. A mixing step is provided, wherein a plastic base material and a curing agent are uniformly mixed. The plastic base material includes a TPU and a silicone gum. The silicone gum includes at least two alkenyl groups in each of molecules thereof. A weight ratio of the TPU and the silicone gum is ranging from 95.01:4.99 to 99.5:0.5. The curing agent has an adding amount enabling the silicone gum to crosslink to form a silicone rubber. A dynamic vulcanization is provided. The silicone gum is crosslinked to form the silicone rubber so as to obtain the thermoplastic polyurethane composite material.

According to yet another aspect of the present disclosure, a thermoplastic polyurethane composite material made by the aforementioned method is provided.

According to further another aspect of the present disclosure, a shoe material made by the aforementioned thermoplastic polyurethane composite material is provided, wherein the shoe material is a shoe outsole or a shoe upper.

According to further another aspect of the present disclosure, a wearable apparatus includes a main body. The main body is made by the aforementioned thermoplastic polyurethane composite material.

BRIEF DESCRIPTION OF THE DRAWINGS

The present disclosure can be more fully understood by reading the following detailed description of the embodiment, with reference made to the accompanying drawings as follows.

DETAILED DESCRIPTION

<Thermoplastic Polyurethanne Composite Material Composition>

Figure 1:
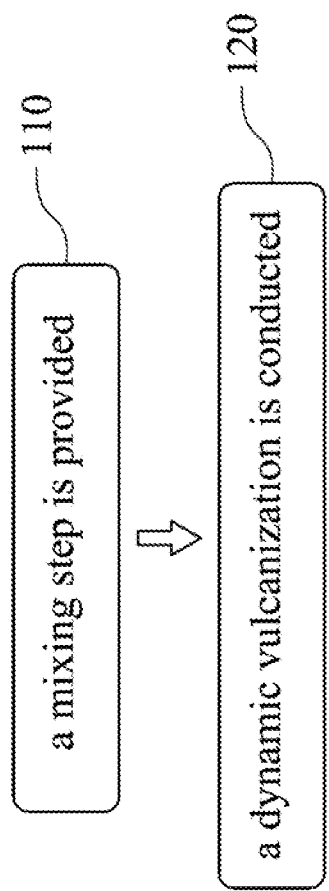
FIG. 1 is a flow diagram showing a method for manufacturing a thermoplastic polyurethane composite material according to one embodiment of the present disclosure.

A thermoplastic polyurethane composite material composition includes a plastic base material and a curing agent, and can selectively include a filler and/or a catalyst.

The plastic base material includes a TPU and a silicone gum. The silicone gum includes at least two alkenyl groups in each of molecules thereof. The TPU and the silicone gum are uniformly mixed, and a weight ratio of the TPU and the silicone gum is ranging from 95.01:4.99 to 99.5:0.5. The curing agent is uniformly mixed with the plastic base material, wherein the curing agent has an adding amount enabling the silicone gum to crosslink to form a silicone rubber.

When the weight ratio of the TPU and the silicone gum is ranging from 95.01:4.99 to 99.5:0.5, the thermoplastic polyurethane composite material made by the thermoplastic polyurethane composite material composition can include a specific amount of silicone rubber. Therefore, the slip resistance of a pure TPU can be improved without sacrificing the physical properties (such as abrasion resistance) of the pure TPU. In other words, the thermoplastic polyurethane composite material according to the present disclosure is featured with excellent slip resistance and abrasion resistance at the same time.

With the crosslinking of the silicone gum after uniformly mixing the TPU and the silicone gum a semi-interpenetrating network (TPU molecules are interpenetrated in a network of the silicone rubber) can be formed. A phase separation of the thermoplastic polyurethane composite material cannot occur easily (i.e., the TPU tends not to separate from the silicone rubber). Accordingly, uniform physical properties can be provided, and the production yields can be enhanced.

The TPU can be a polyester TPU or a polyether TPU. The TPU can be but not limited to the following products: BTS-65A, BTS-70A, EME-75A, EME-85A EME-90A, EMH-95A or EMH-64D. A hardness of the TPU can be ranging from 65 A to 64D. Therefore, the thermoplastic polyurethane composite materials with different hardness can be obtained. The manufacturing method of the TPU and the method for adjusting the hardness of the TPU are conventional, and will not be repeated herein.

The Williams plasticity number of the silicone gum can be ranging from 100 to 600. The silicone gum can be but not limited to the following products: KET-080U, CHN-ROLL-80, KE-785-U, KE-581-U, KE-880-U, SH5180U, GS-800U, TSE-221-8U and SH1080U.

The aforementioned "curing agent" is a substance which causes the silicone gum to crosslink. The curing agent can be a peroxide or a compound containing at least one silicon hydrogen bond. When the curing agent is a compound containing at least one silicon hydrogen bond, the thermoplastic polyurethane composite material composition can further include a platinum catalyst. Therefore, the crosslinking rate of the silicone gum can be increased.

The peroxide can be but not limited to 1,3-Bis(tert-butylperoxyisopropyl)benzene, 1,4-Bis(tert-butylperoxyisopropyl)benzene, Dicumyl peroxide (DCP), tert-butylcumylperoxide (TBCP), 2,5-dimethyl-2,5-di-(tert-butylperoxy)hexane (DHBP), n-butyl-4,4-di(tert-butylperoxy)valerate or 1,1-di(tert-butylperoxy)-3,3,5-trimethylcyclohexane. A weight ratio of the peroxide and the silicone gum can be ranging from 0.1:100 to 5:100. Therefore, the silicone gum can be crosslinked completely, which can improve the uniformity of physical properties of the thermoplastic polyurethane composite material.

The compound containing at least one silicon hydrogen bond can include at least two hydrogen atoms which connect with a silicon atom. The compound containing at least one silicon hydrogen bond can be but not limited to $H(CH_3)_2SiOSi(CH_3)_2H$, $H(CH_3)_2SiOSi(CH_3)_2OSi(CH_3)_2H$ or $H_2(C_6H_5)SiOSi(CH_3)_2H$.

The aforementioned "platinum catalyst" is a substance containing a platinum atom or a platinum on which can accelerate the crosslinking rate of the silicone gum. The platinum catalyst can be but is not limited to platinum black, chloroplatinic acid, platinum dichloride or platinum tetrachloride.

A weight ratio of the compound containing at least one silicon hydrogen bond and the silicone gum can be ranging from 0.1:100 to 2:100, and a weight ratio of the platinum catalyst and the silicone gum can be ranging from 0.1:100 to 0.5:100. Using the peroxide or the compound containing at least one silicon hydrogen bond (the platinum catalyst can be added) to cause the silicone gum to crosslink is conventional, and will not be repeated herein.

The aforementioned "filler" is for increasing the mechanical strength of the thermoplastic polyurethane composite material. The filler can be but is not limited to calcium carbonate, mica, titanium dioxide or clay. A weight ratio of the filler and the plastic base material can be ranging from 0.1:99.9 to 10:90.

<Method for Manufacturing a Thermoplastic Polyurethane Composite Material>

The method to obtain the thermoplastic polyurethane composite material by the aforementioned thermoplastic polyurethane composite material composition is described in detail as follows. FIG. 1 is a flow diagram showing a method for manufacturing the thermoplastic polyurethane composite material according to one embodiment of the present disclosure. In FIG. 1, the method for manufacturing the thermoplastic polyurethane composite material includes Step 110 and Step 120.

In Step 110 a mixing step is provided, wherein a plastic base material and a curing agent are uniformly mixed. The plastic base material includes a TPU and a silicone gum, a weight ratio of the TPU and the silicone gum is ranging from 95.01:4.99 to 99.5:0.5. The TPU, the silicone gum and the curing agent have been described above, and will not be repeated herein.

In Step 120, a dynamic vulcanization is conducted, wherein the silicone gum is crosslinked to form the silicone rubber so as to obtain the thermoplastic polyurethane composite material.

Specifically. Step 110 can be conducted in a kneader, and Step 120 can be conducted in an extruder. The extruder can be but not limited to a 42 mm biaxial extruder. Step 120 can be conducted at a temperature ranging from 165° C. to 220° C. The rotational speed of a screw of the extruder can be 150 rpm (revolutions per minute) to 800 rpm. The output capacity of the extruder can be 10 kg/hr to 45 kg/hr. Therefore, the thermoplastic polyurethane composite material can be formed in chips. The chips of the thermoplastic polyurethane composite material can be further processed to manufacture a variety of products, such as via extrusion molding or injection molding. The technique of extrusion molding or injection molding is conventional, and will not be repeated herein. Comparing the thermoplastic polyurethane composite material to a TPU physically mixed with a silicone rubber, a migration phenomenon tends to occur on the TPU physically mixed with a silicone rubber. As a result, the entire composition of the TPU physically mixed with the silicone rubber is uneven, and uniform physical properties are difficult to be provided. The thermoplastic polyurethane composite material according to the present disclosure can be formed in the semi-interpenetrating network by the dynamic vulcanization, which deters the phase separation of the thermoplastic polyurethane composite material. Accordingly, uniform physical properties can be provided, and the production yields can be enhanced.

<Thermoplastic Polyurethane Composite Material and Application Thereof>

According to the aforementioned thermoplastic polyurethane composite material composition and the method for manufacturing the thermoplastic polyurethane composite material, the thermoplastic polyurethane composite material featured with excellent slip resistance and abrasion resistance can be obtained. The thermoplastic polyurethane composite material according to the present disclosure can be manufactured by a TPU having a hardness of 65 A to 64 D. Therefore, the thermoplastic polyurethane composite material has an advantage of a wide range of hardness, which can broaden the scope of the application thereof. According to one embodiment of the present disclosure, the thermoplastic polyurethane composite material can be manufactured by a TPU having a hardness of 65 A. Therefore, the slip resistance and the abrasion resistance of the thermoplastic polyurethane composite material are significantly improved. In general, when the abrasion resistance of a plastic material is enhanced, the slip resistance is usually sacrificed. Alternately, when the slip resistance of the plastic material is enhanced, the abrasion resistance is usually sacrificed. By adding a specific amount of silicon gum and the dynamic vulcanization, the thermoplastic polyurethane composite material according to the present disclosure can be featured with excellent slip resistance and abrasion resistance at the same time.

Figure 2:
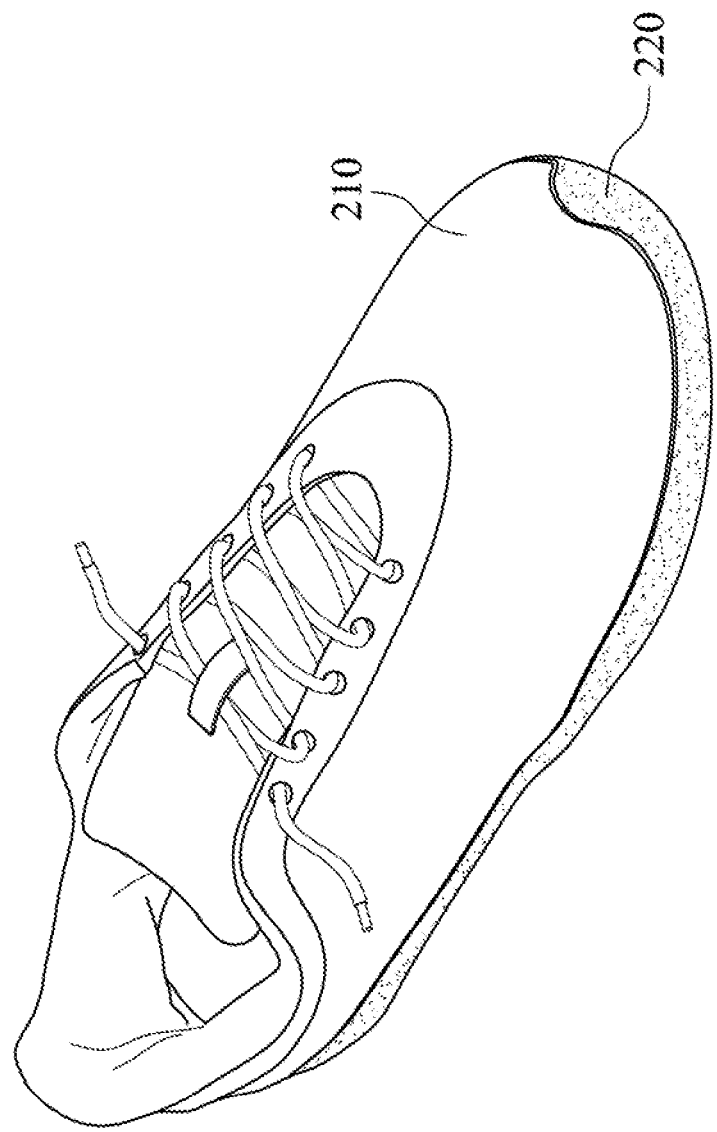
FIG. 2 shows a shoe according to another embodiment of the present disclosure.

FIG. 2 shows a shoe according to another embodiment of the present disclosure. The shoe includes a shoe upper 210 and a shoe outsole 220. The shoe upper 210 and/or the shoe outsole 220 can be made by the thermoplastic polyurethane composite material. The shoe upper 210 made by the thermoplastic polyurethane composite material can have a longer lifetime. Moreover, the shoe upper 210 made by the thermoplastic polyurethane composite material is particularly suitable for soccer shoes, which is favorable for a wearer to control a track and a d rest on of a soccer. The shoe outsole 220 made by the thermoplastic polyurethane composite material can provide the necessary slip resistance and abrasion resistance. On one hand, it is favorable to use on a damp or smooth road so as to enhance the safety. On the other hand the lifetime can be prolonged. Furthermore the shoe upper 210 and the shoe outsole 220 made by the thermoplastic polyurethane composite material are recyclable, which complies with environmental demands.

Figure 3:
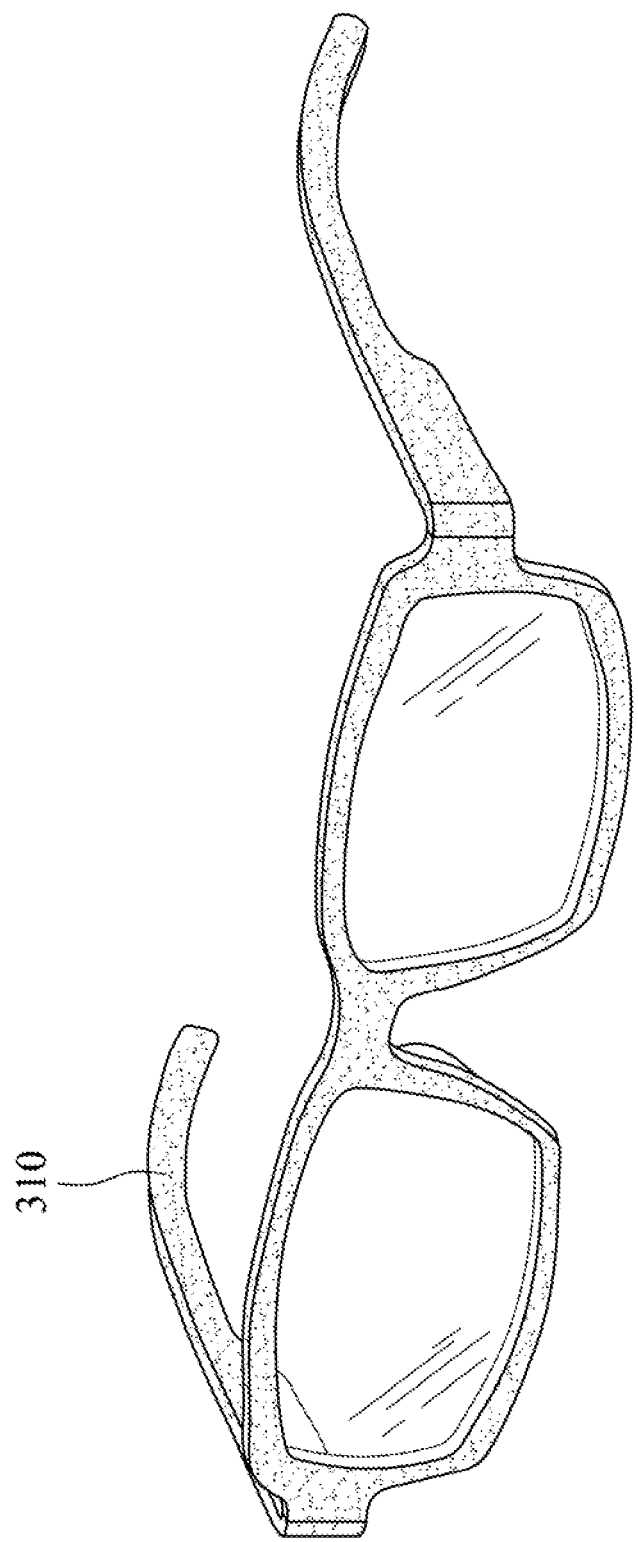
FIG. 3 shows a wearable apparatus according to yet another embodiment of the present disclosure.

FIG. 3 shows a wearable apparatus according to yet another embodiment of the present disclosure. In FIG. 3, the wearable apparatus is a head-mounted display (HMD). The wearable apparatus includes a main body 310. The main body 310 is made by the thermoplastic polyurethane composite material. Therefore, the main body 310 simultaneously has excellent slip resistance and abrasion resistance. Furthermore, the main body 310 is nontoxic, skin affinitive and recyclable, which complies with the environmental demands. Moreover an excellent tactile sensation can be provided, which is favorable to long-time wear.

Figure 4:
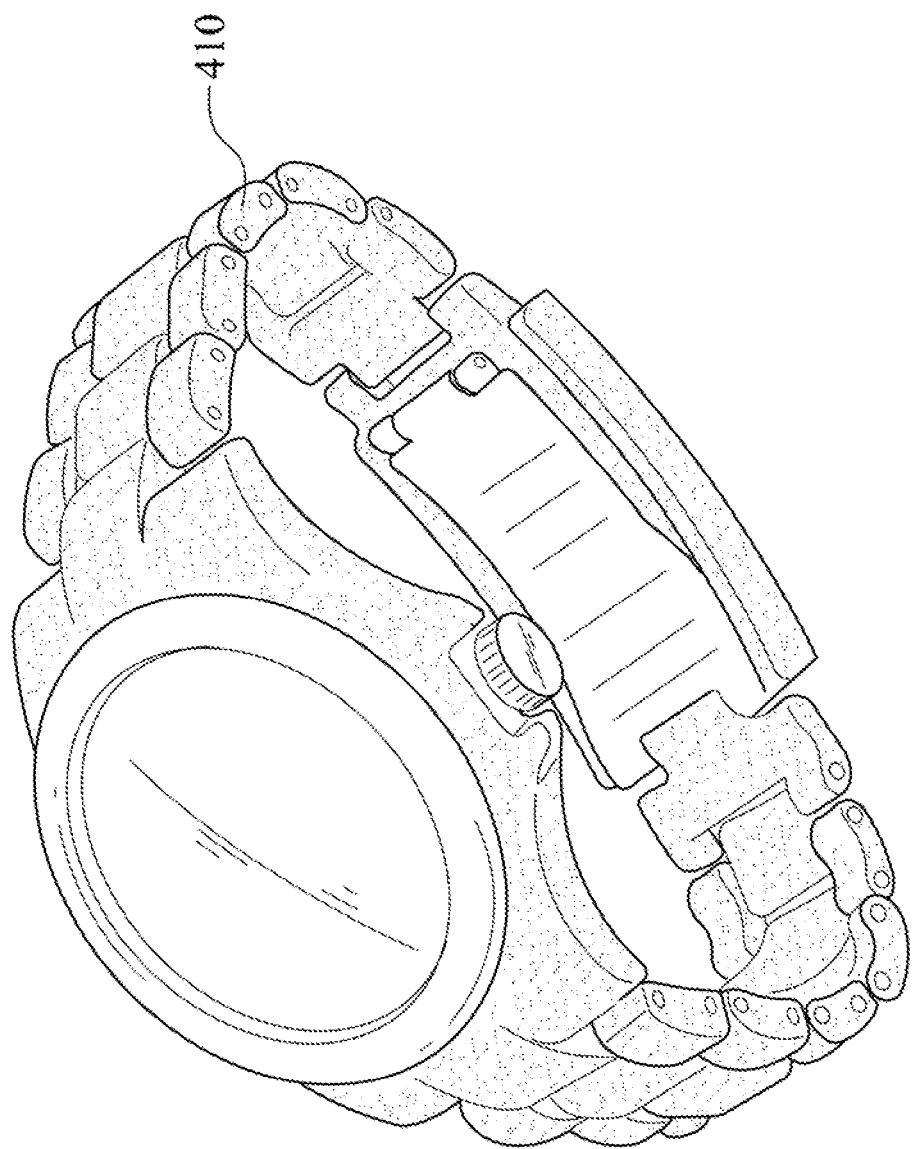
FIG. 4 shows a wearable apparatus according to further another embodiment of the present disclosure.

FIG. 4 shows a wearable apparatus according to further another embodiment of the present disclosure. In FIG. 4, the wearable apparatus is a smart watch. The wearable apparatus includes a main body 410. The main body 410 is made by the thermoplastic polyurethane composite material. Therefore, the main body 410 has excellent slip resistance and abrasion resistance simultaneously. Furthermore, the main body 410 is nontoxic, skin affinitive and recyclable, which complies with environmental demands. Moreover, an excellent tactile sensation can be provided, which is favorable to long-time wear.

EXAMPLES

The thermoplastic polyurethane composite material of Examples 1-20 are provided, and the method for manufacturing the thermoplastic polyurethane composite material of Examples 1-20 are recited as follows.

Example 1

A TPU having a hardness 65 A (product name is BTS-65 A), a silicon gum (product name is KET-080 U) and a curing agent are put into a kneader and are mixed by the kneader. A weight ratio of the TPU and the silicone gum is 99.5:0.5. The curing agent is 1,3-Bis(tert-butylperoxyisopropyl)benzene, and a weight ratio of the curing agent and the silicone gum is 1:100. Afterwards, a uniformly mixed plastic base material and the curing agent are put into a 42 mm biaxial extruder. A dynamic vulcanization is conducted at a temperature ranging from 165° C. to 220° C., the rotational speed of a screw of the extruder is 150 rpm to 800 rpm, and the output capacity of the extruder is 10 kg/hr to 45 kg/hr. The thermoplastic polyurethane composite material in chips are obtained in this way. The chips of the thermoplastic polyurethane composite material are further processed by injection molding, which is conducted at a temperature of 180° C. and a pressure of 40 bar, so that the thermoplastic polyurethane composite material in a sheet with a thickness of 2 mm is obtained.

Examples 2-20 and Comparative Example 2 the differences between Examples 2-20, Comparative Example 2 and Example 1 is the hardness of TPU and/or the weight ratio of the TPU and the silicone gum, and the other reaction conditions of Examples 2-20 and Comparative Example 2 are the same as that of Example 1. The hardness of TPU and the weight ratio of the TPU and the silicone gum of Examples 1-20 and Comparative Example 2 are listed in Table 1.

The pure TPU of Comparative Example 1 and Comparative Example 3 are provided, and the method for manufacturing the pure TPU of Comparative Example 1 and Comparative Example 3 are recited as follows.

Comparative Example 1

The TPU having a hardness 65 A (product name is BTS-65 A) is processed with injection molding, which is conducted at a temperature of 180° C. and a pressure of 40 bar, so that the pure TPU in a sheet with a thickness of 2 mm is obtained.

Comparative Example 3 the difference between. Comparative Example 3 and Comparative Example 1 is the hardness of the TPU, which is shown in Table 1. The other reaction conditions of Comparative Example 3 are the same as that of Comparative Example 1.

TABLE 1

| Example | Hardness of the TPU | Weight ratio of the TPU and the silicon rubber |
|---|---|---|
| 1 | 65A | 99.5:0.5 |
| 2 | 65A | 99.3:0.7 |
| 3 | 65A | 99.0:1.0 |
| 4 | 65A | 98.0:2.0 |
| 5 | 65A | 97.0:3.0 |
| 6 | 65A | 96.0:4.0 |
| 7 | 65A | 95.01:4.99 |
| 8 | 80A | 99.0:1.0 |
| 9 | 80A | 98.0:2.0 |
| 10 | 80A | 97.0:3.0 |
| 11 | 80A | 96.0:4.0 |
| 12 | 80A | 95.5:4.5 |
| 13 | 80A | 95.01:4.99 |
| 14 | 65A | 95.01:4.99 |
| 15 | 70A | 95.01:4.99 |
| 16 | 75A | 95.01:4.99 |
| 17 | 80A | 95.01:4.99 |
| 18 | 85A | 95.01:4.99 |
| 19 | 90A | 95.01:4.99 |
| 20 | 95A | 95.01:4.99 |
| Comparative Example | | |
| 1 | 65A | 100:0 |
| 2 | 65A | 50:50 |
| 3 | 80A | 100:0 |

The thermoplastic polyurethane composite material of Examples 1-20 and Comparative Example 2, and the pure TPU of Comparative Example 1 and Comparative Example 3 are conducted the following property evaluations: (A) modulus 100% (unit: kg/cm²), (8) modulus 300% (unit kg/cm²), (C) tensile strength (unit: kg/cm²), (D) elongation at break (unit: %), (E) tear strength (unit: kg/cm²) (F) hardness (unit: shore A), (G) density (unit, g/cm³), (H) abrasion resistance (unit: mm³), wherein (A) is evaluated according to DIN 53504, (B) is evaluated according to DIN 53504, (C) is evaluated according to DIN 53504, (D) is evaluated according to DIN 53504, (E) is evaluated according to DIN 53515, (F) is evaluated according to DIN 53505, (G) is evaluated according to DIN 53479, and (H) is evaluated according to DIN 53516. The result of the property evaluations are listed in Table 2.

TABLE 2

| | (A) | (B) | (C) | (D) | (E) | (F) | (G) | (H) |
|---|---|---|---|---|---|---|---|---|
| Example | | | | | | | | |
| 1 | 34 | 45 | 219 | 1116 | 67 | 70 | 1.2 | 91 |
| 2 | 34 | 44 | 211 | 1193 | 65 | 69 | 1.2 | 72 |
| 3 | 34 | 45 | 222 | 1142 | 66 | 69 | 1.2 | 56 |
| 4 | 34 | 44 | 215 | 1122 | 66 | 69 | 1.2 | 25 |
| 5 | 34 | 45 | 216 | 1109 | 66 | 69 | 1.2 | 22 |
| 6 | 37 | 50 | 231 | 1043 | 66 | 68 | 1.2 | 15 |
| 7 | 36 | 50 | 215 | 1075 | 61 | 69 | 1.2 | 16 |
| 8 | 46 | 72 | 221 | 702 | 82 | 83 | 1.21 | 28 |
| 9 | 46 | 71 | 236 | 699 | 87 | 84 | 1.21 | 14 |
| 10 | 46 | 70 | 232 | 726 | 88 | 83 | 1.21 | 15 |
| 11 | 45 | 71 | 224 | 675 | 90 | 82 | 1.21 | 19 |
| 12 | 44 | 67 | 206 | 736 | 85 | 81 | 1.21 | 22 |
| 13 | 42 | 59 | 216 | 920 | 83 | 81 | 1.21 | 18 |
| 14 | 38 | 45 | 227 | 1017 | 67 | 71 | 1.20 | 13 |
| 15 | 37 | 53 | 195 | 956 | 66 | 72 | 1.19 | 18 |
| 16 | 41 | 58 | 209 | 1047 | 73 | 75 | 1.21 | 13 |
| 17 | 50 | 72 | 276 | 875 | 78 | 82 | 1.22 | 12 |
| 18 | 66 | 97 | 295 | 729 | 92 | 85 | 1.22 | 15 |
| 19 | 85 | 99 | 243 | 650 | 104 | 91 | 1.23 | 20 |
| 20 | 91 | 130 | 298 | 627 | 138 | 95 | 1.23 | 24 |
| Comparative Example | | | | | | | | |
| 1 | 40 | 55 | 236 | 990 | 72 | 71 | 1.2 | 150 |
| 2 | 28 | 47 | 48 | 350 | 28 | 60 | 1.2 | 290 |
| 3 | 45 | 68 | 268 | 718 | 83 | 80 | 1.19 | 153 |

As shown in Examples 1-7 and Comparative Examples 1-2, when the hardness of the TPU equals to 65 A and the weight ratio of the TPU and the silicon gum is in the range from 95.01:4.99 to 99.5:0.5, the abrasion resistance can be improved significantly. As shown in Examples 8-13 and Comparative Example 3, when the hardness of the TPU equals to 80 A and the weight ratio of the TPU and the silicon gum is in the range from 95.01:4.99 to 99.5:0.5, the abrasion resistance can be improved significantly.

The thermoplastic polyurethane composite material of Examples 14-18, and the pure TPU of Comparative Example 1 and Comparative Example 3 are further conducted the following property evaluations: (I) coefficient of dry static friction, and (J) coefficient of wet static friction, (I) and (J) are evaluated according to ASTM D1894. When the value of the coefficient of dry static friction or the coefficient of wet static friction is larger, the slip resistance may be improved. The result of the property evaluations of (i) and (J) of Examples 14-18, the Comparative Example 1 and the Comparative Example 3 are listed in Table 3.

TABLE 3

| | (I) | (J) | (H) |
|---|---|---|---|
| Example | | | |
| 14 | 1.665 | 1.267 | 13 |
| 15 | 1.553 | 1.062 | 18 |
| 16 | 1.540 | 0.880 | 13 |
| 17 | 1.207 | 0.703 | 12 |
| 18 | 1.197 | 0.601 | 15 |
| Comparative Example | | | |
| 1 | 1.190 | 1.080 | 150 |
| 3 | 1.080 | 0.470 | 153 |

As shown in Table 3, the thermoplastic polyurethane composite material according to the present disclosure has excellent slip resistance and abrasion resistance. Specifically, the hardness of the TPU of Example 14 and the hardness of the TPU of the Comparative Example 1 are 65 A, however, the slip resistance and abrasion resistance of Example 14 are better than that of Comparative Example 1. The hardness of the TPU of Example 17 and the hardness of the TPU of Comparative Example 3 is 65 A, however, the slip resistance and abrasion resistance of Example 17 are better than that of Comparative Example 3.

The sheet of the thermoplastic polyurethane composite material of Example 14 is further subjected to a vitro cytotoxicity test, wherein the mouse lung fibroblast cells (L929 cells) and an extract of the sheet of thermoplastic polyurethane composite material of Example 14 are tested according to ISO10993-12 and ISO10993-5* ("*" represents that the method has been certified by ISO/IEC 17025)

According to the results of the vitro cytotoxicity test, the extract of the sheet of the thermoplastic polyurethane composite material of Example 14 doesn't induce the cytotoxicity of the L929 cells. It is concluded that the thermoplastic polyurethane composite material according to the present disclosure is nontoxic, and has biocompatibility.

The sheet of the thermoplastic polyurethane composite material of Example 14 is further subjected to a skin irritation evaluation, wherein the extract of the sheet of the thermoplastic polyurethane composite material of Example 14 is applied, to the skin of New Zealand white rabbits, which is performed following ISO 10993-10:2010. According to the results of the skin irritation evaluation, the extract of the sheet of thermoplastic polyurethane composite material of Example 14 doesn't cause any erythema or edemas on the skin of the New Zealand white rabbits, and doesn't cause the death of the New Zealand white rabbits. The primary irritation index (PII) is zero. That is, the thermoplastic polyurethane composite material according to the present disclosure doesn't irritate the skin and has skin affinity, which is suitable for applying to wearable apparatus.

The sheet of the thermoplastic polyurethane composite material of Example 14 is further subjected to an evaluation of possibility of delayed hypersensitivity, wherein a polar extract and a nonpolar extract of the sheet of the thermoplastic polyurethane composite material of Example 14 are applied to a skin of guinea pigs, which is performed following ISO 10993-10:2010. According to the result, the polar extract and the nonpolar extract of the sheet of thermoplastic polyurethane composite material of Example 14 doesn't cause, any visible change on the skin of the guinea pigs. The Magnusson Kligman scale (ISO 10993-10:2010) is zero. It is concluded that the thermoplastic polyurethane composite material according to the present disclosure doesn't cause delayed hypersensitivity and has skin affinity, which is suitable for applying to a wearable apparatus.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure, in view of the foregoing, it is intended that the present disclosure cover modifications and variations of this disclosure provided they fall within the scope of the following claims.

What is claimed is:

1. A thermoplastic polyurethane composite material, wherein the thermoplastic polyurethane composite material is made by a method comprising:
    providing a mixing step, wherein a plastic base material and a curing agent are uniformly mixed, the plastic base material comprises a thermoplastic polyurethane and a silicone gum, a hardness of the thermoplastic polyurethane is 65 A, the silicone gum comprises at least two alkenyl groups in each of molecules thereof, a weight ratio of the thermoplastic polyurethane and the silicone gum is ranging from 95.01:4.99 to 9.5:115, the curing agent is added in an amount enabling the silicone gum to crosslink to form a silicone rubber; and
    conducting a dynamic vulcanization, wherein the silicone gum is crosslinked to form the silicone rubber so as to obtain thermoplastic polyurethane composite material.

2. A shoe material made from a thermoplastic, polyurethane composite material, wherein the shoe material is a shoe outsole or a shoe upper, and the thermoplastic polyurethane composite material is made by a method comprising:
    providing a mixing step, wherein a plastic base material and a curing agent are uniformly mixed, the plastic base material comprises a thermoplastic polyurethane and a silicone gum, the silicone gum comprises at least two alkenyl groups in each of molecules thereof, a weight ratio of the thermoplastic polyurethane and the silicone gum is ranging from 95.01:4.99 to 99.5:0.6, the curing agent is added in an amount enabling the silicone gum to crosslink to form a silicone rubber; and
    conducting a dynamic vulcanization, wherein the silicone gum is crosslinked to form the silicone rubber so as to obtain the thermoplastic polyurethane composite material.

3. A head-mounted display being a pair of glasses, comprising:
    a glasses frame made from a thermoplastic thermoplastic polyurethane composite material is made by a method comprising:
    providing a mixing step, wherein a plastic base material and a curing agent are uniformly mixed, the plastic base material comprises a thermoplastic polyurethane and a silicone gum, the silicone gum comprises at least two alkenyl groups in each of molecules thereof, a weight ratio of the thermoplastic polyurethane and the silicone gum is ranging from 95.01:4.99 to 99.5:0.5, the curing agent is added in an amount enabling the silicone gum to crosslink to form a silicone rubber; and
    conducting a dynamic vulcanization wherein the silicone gum is crosslinked to form the silicone rubber so as to obtain the thermoplastic polyurethane composite material.

4. A smart watch, comprising:
    a watchband made by a thermoplastic polyurethane composite material, wherein the thermoplastic polyurethane composite material is made from a method comprising:
    providing a mixing step, wherein a plastic base material and a curing are uniformly mixed, the plastic base material comprises thermoplastic polyurethane and a silicone gum the silicone gum comprises at least two alkenyl groups in each of molecules thereof, weight ratio of the thermoplastic polyurethane and the silicone gum is ranging from 95.0:4.99 to 99.5:0.5, the curing agent is added in an amount enabling the silicone gum to crosslink to form a silicone rubber; and
    conducting a dynamic vulcanization, wherein the silicone gum is crosslinked to form the silicone rubber so as to obtain the thermoplastic polyurethane composite material.

* * * * *